United States Patent
Shih et al.

(10) Patent No.: US 9,401,627 B2
(45) Date of Patent: Jul. 26, 2016

(54) REDUNDANT POWER SUPPLY SYSTEM PROVIDING ALTERNATE STANDBY

(71) Applicant: ZIPPY TECHNOLOGY CORP., New Taipei (TW)

(72) Inventors: Tsun-Te Shih, New Taipei (TW); Yu-Yuan Chang, New Taipei (TW); Heng-Chia Chang, New Taipei (TW)

(73) Assignee: Zippy Technology Corp., New Taipei (TW)

( * ) Notice: Subject to any disclaimer, the term of this patent is extended or adjusted under 35 U.S.C. 154(b) by 127 days.

(21) Appl. No.: 14/510,559

(22) Filed: Oct. 9, 2014

(65) Prior Publication Data

US 2016/0105057 A1  Apr. 14, 2016

(51) Int. Cl.
| | |
|---|---|
| G06F 1/00 | (2006.01) |
| G06F 1/32 | (2006.01) |
| H02J 1/10 | (2006.01) |
| H02J 9/06 | (2006.01) |
| H02M 7/02 | (2006.01) |
| H02M 1/42 | (2007.01) |

(52) U.S. Cl.
CPC ............... *H02J 9/061* (2013.01); *H02M 1/42* (2013.01); *H02M 7/02* (2013.01)

(58) Field of Classification Search
CPC .................................................. G06F 1/3203
USPC ........................................................ 713/323
See application file for complete search history.

(56) References Cited

U.S. PATENT DOCUMENTS

| | | | | |
|---|---|---|---|---|
| 7,793,123 | B2* | 9/2010 | Chen | 713/300 |
| 7,962,772 | B2* | 6/2011 | Jain | 713/300 |
| 8,051,316 | B2* | 11/2011 | Roberts et al. | 713/330 |
| 8,816,532 | B2* | 8/2014 | Shih et al. | 307/43 |
| 2010/0185884 | A1* | 7/2010 | Chen et al. | 713/321 |
| 2013/0119768 | A1* | 5/2013 | Chang | 307/66 |
| 2014/0070616 | A1* | 3/2014 | Shih et al. | 307/64 |
| 2016/0062431 | A1* | 3/2016 | Shih et al. | 713/310 |

* cited by examiner

*Primary Examiner* — Suresh Suryawanshi
(74) *Attorney, Agent, or Firm* — Muncy, Geissler, Olds & Lowe, P.C.

(57) ABSTRACT

A redundant power supply system providing alternate standby includes at least one primary power supply, at least one secondary power supply and a power integration panel. Each primary power supply receives a first power ON/OFF signal and starts to output a primary duty power. Each secondary power supply receives a second power ON/OFF signal and starts to output a secondary duty power. The power integration panel is electrically connected to the primary power supply and the secondary power supply and has a standby mode to receive a power ON/OFF signal from a motherboard and output alternately at a selected time interval the first power ON/OFF signal to the primary power supply or the second power ON/OFF signal to the secondary power supply to make the primary power supply and the secondary power supply on standby alternately.

11 Claims, 3 Drawing Sheets

REDUNDANT POWER SUPPLY SYSTEM PROVIDING ALTERNATE STANDBY

FIELD OF THE INVENTION

The present invention relates to a redundant power supply system and particularly to a redundant power supply system that provides alternate standby.

BACKGROUND OF THE INVENTION

Technology industry at present usually has high demand on power supply system stability. To meet this end a redundant power supply system has been developed. The redundant power supply system mainly includes a primary power supply, a secondary power supply for backup and a power integration panel. When power supply is started the power integration panel receives electric power output from the primary power supply and the secondary power supply to supply a load. The power integration panel further determines the output power supplied by the primary power supply and the secondary power supply according to energy consumption status of the connected load. In other words, energy consumption required by working of the load is shared and provided by the primary power supply and the secondary power supply. In the event that the primary power supply malfunctions incidentally, the power integration panel regulates and increases the output power of the secondary power supply to compensate the portion of power that cannot be provided by the primary power supply to meet working requirement of the load.

However, after the conventional redundant power supply system has been electrically energized and started, the primary power supply and the secondary power supply are at the start working state in regular conditions. But in practice the redundant power supply system is not at a rated full loading output working state for a prolonged duration. It also could be in a working condition of light load output. In the light load output working condition the secondary power supply is regulated by the power integration panel in a duty mode with light load supply, or even enters a standby state, with the primary power supply providing power supply at the rated power. As a result, the primary power supply is at a duty state to supply the rated output for a prolonged duration, while the secondary power supply is at the standby state for the prolonged duration. Hence the structural units of the primary power supply could result in a shorter lifespan on the composed elements due to the prolonged operation, and the primary power supply tends to malfunction easier than the secondary power supply.

SUMMARY OF THE INVENTION

The primary object of the present invention is to solve the problem of system the conventional redundant power supply system of unable to evenly distribute duty duration of each power supply and result in one power supply is at a duty state for a prolonged period that could make the lifespan of the power supply running in the prolonged period shorter than the rest power supply included in the redundant power supply system.

To achieve the foregoing object the present invention provides a redundant power supply system capable of providing alternate standby. It includes at least one primary power supply, at least one secondary power supply and a power integration panel. Each primary power supply includes a first boot up state to receive a first power ON/OFF signal to transform external power and output a primary duty power, and a first standby state to stop transformation of the external power. Each secondary power supply includes a second boot up state to receive a second power ON/OFF signal to transform the external power to a secondary duty power, and a second standby state to stop transformation of the external power. The power integration panel is electrically connected to the primary power supply and the secondary power supply, and includes an energy-saving control loop to receive a power ON/OFF signal from a motherboard and perform simulation to generate the first power ON/OFF signal or the second power ON/OFF signal, and also includes a standby mode to receive the power ON/OFF signal from the motherboard and output alternately at a selected time interval the first power ON/OFF signal to the primary power supply or the second power ON/OFF signal to the secondary power supply to make the primary power supply and the secondary power supply on standby alternately.

In one embodiment the power integration panel further has a first line to bridge the energy-saving control loop and the primary power supply to output the first power ON/OFF signal to the primary power supply, and a second line to bridge the energy-saving control loop and the secondary power supply to output the second power ON/OFF signal to the secondary power supply In another embodiment the primary power supply generates a first light load duty parameter or a first heavy load duty parameter at the first boot up state according to the primary duty power output by comparing with an output comparison datum, and the secondary power supply generates a second light load duty parameter or a second heavy load duty parameter at the second boot up state according to the secondary duty power output by comparing with the output comparison datum. The power integration panel receives the first light load duty parameter or the second light load duty parameter, then determines to enter the standby mode.

In yet another embodiment the power integration panel further includes a power supply start mode to receive the first heavy load duty parameter and the second heavy load duty parameter, and output respectively at the same time the first power ON/OFF signal and the second power ON/OFF signal to the primary power supply and the secondary power supply.

In yet another embodiment the power integration panel further includes an energy-saving control loop to receive the first light load duty parameter, the first heavy load duty parameter, the second light load duty parameter or the second heavy load duty parameter to determine the power integration panel to enter the standby mode.

In yet another embodiment the primary power supply includes a first output status analysis unit with the preset output comparison datum to compare with the primary duty power to generate the first light load duty parameter or the first heavy load duty parameter, and the second power supply includes a second output status analysis unit with the preset output comparison datum to compare with the secondary duty power to generate the second light load duty parameter or the second heavy load duty parameter.

In yet another embodiment the power integration panel, after the selected time interval has elapsed, makes the primary power supply not receiving the first power ON/OFF signal or the secondary power supply not receiving the second power ON/OFF signal to defer for a duty time before entering the first standby state or the second standby state.

In yet another embodiment the primary power supply includes a rectification filter unit to receive the external power, a power factor correction unit connected to the rectification filter unit, a transformer, a pulse width control unit, a switch element and a modulation output unit.

In yet another embodiment the secondary power supply includes a rectification filter unit to receive the external power, a power factor correction unit connected to the rectification filter unit, a transformer, a pulse width control unit, a switch element and a modulation output unit.

Through the aforesaid structure, compared with the conventional techniques, the invention provides many advantageous features, notably:

The primary power supply and the secondary power supply can be controlled via the energy-saving control loop to enter alternately the first standby state and the second standby state so that during power supplying of the redundant power supply system the phenomenon of supplying power merely via the primary power supply can be averted, therefore the concern of the primary power supply being overused and might be damaged untimely can be prevented.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
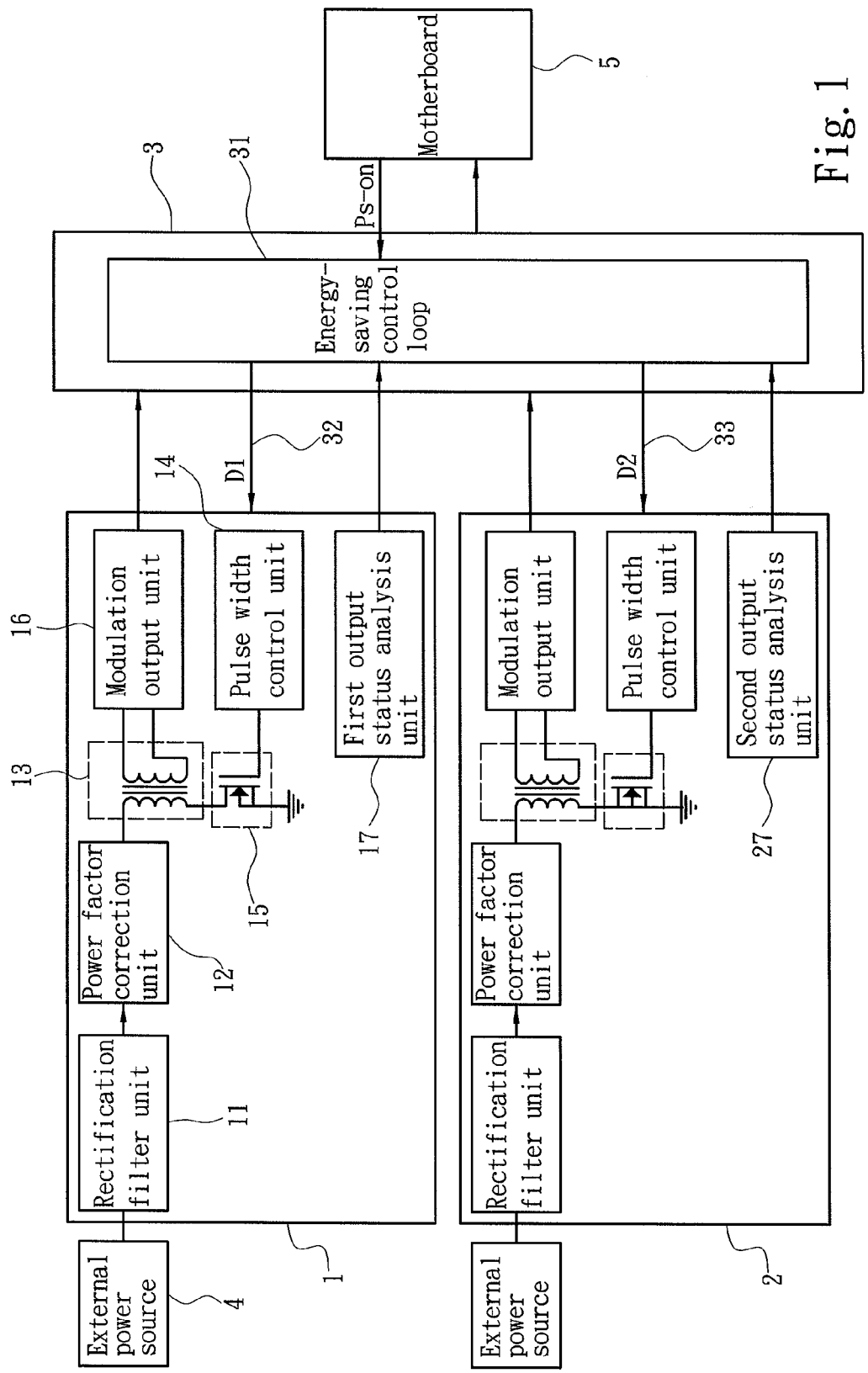
FIG. 1 is a unit structural block diagram of an embodiment of the invention.
Figure 2:
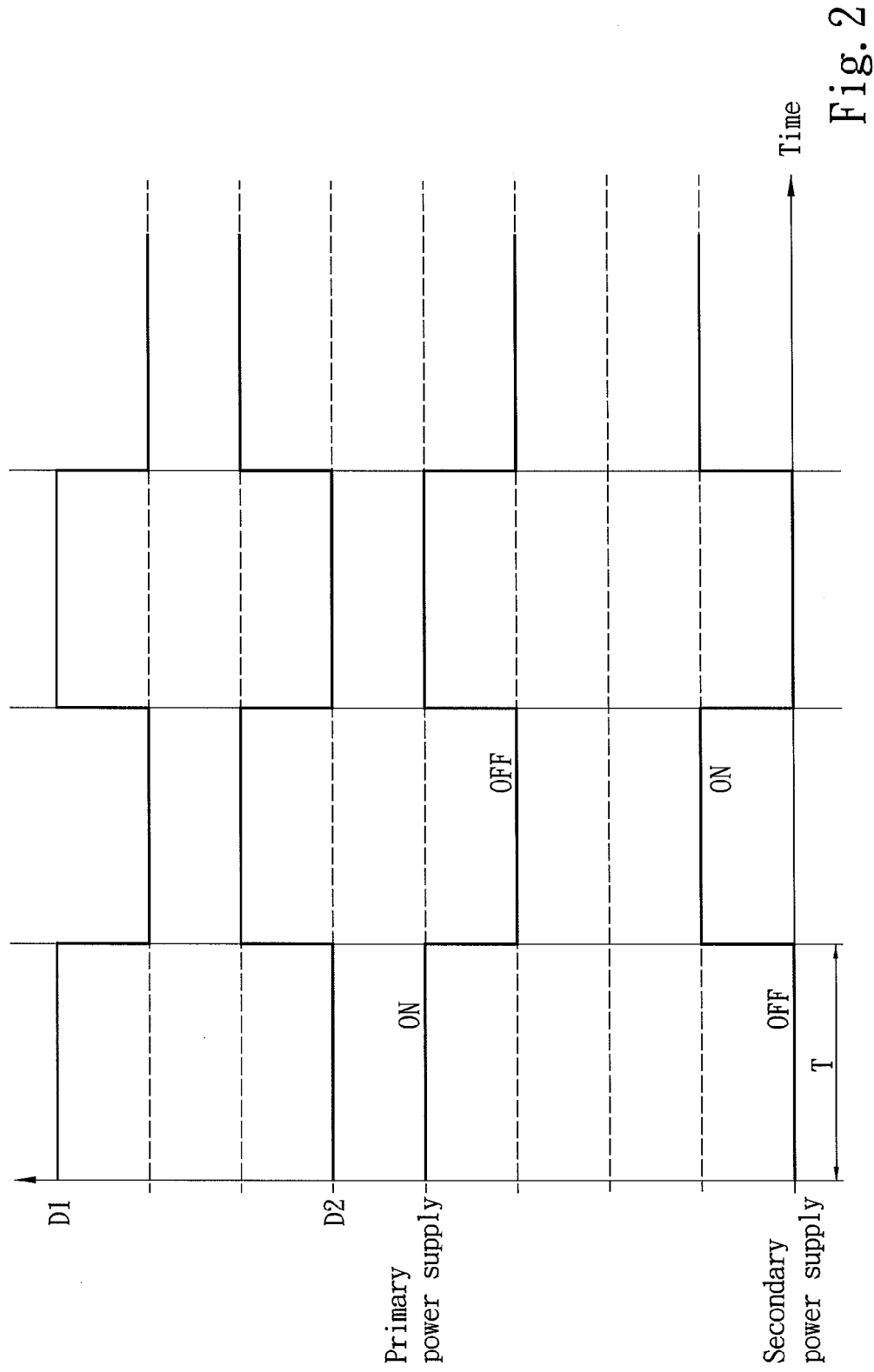
FIG. 2 is a schematic waveform chart of an embodiment of the invention in an implementation condition.

Please referring to FIGS. 1 and 2, the present invention aims to provide a redundant power supply system that can provide alternate standby. It includes at least one primary power supply 1, at least one secondary power supply 2 and a power integration panel 3. The primary power supply 1 and the secondary power supply 2 can include respectively a plurality of sets, namely, in one embodiment the redundant power supply system can include a plurality of primary power supplies 1 and a plurality of secondary power supplies 2.

More specifically, each primary power supply 1 is electrically connected to an external power source 4 to get external power. Each primary power supply 1 includes a rectification filter unit 11 to get the external power, a power factor correction unit 12 connected to the rectification filter unit 11, a transformer 13, a pulse width control unit 14, a switch element 15 and a modulation output unit 16. The primary power supply 1 is controlled and has a first boot up state to receive a first power ON/OFF signal D1 to transform the external power to a primary duty power, and a standby state to stop transformation of the external power. Furthermore, each primary power supply 1 is electrically connected to the power integration panel 3 and receives the first power ON/OFF signal D1 output from the power integration panel 3 to enter the first boot up state. At the first boot up state the rectification filter unit 11 receives the external power from the connected external power source 4, and performs verification and filtering of the external power, and sends the power to the power factor correction unit 12; then the power factor correction unit 12 regulates the external power through a power regulation level and outputs to the primary coil of the transformer 13. The pulse width control unit 14, after started, outputs a pulse width modulation signal to control ON period of the switch element 15. When the switch element 15 is ON the primary coil of the transformer 13 is conductive and forms magnetic coupling with the secondary coil of the transformer 13 to generate an induction power; then the transformer 13 outputs the induction power to the modulation output unit 16 which modulates the power level of the induction power to generate the primary duty power output to the power integration panel 3.

Moreover, each secondary power supply 2 can be constructed via units same as the primary power supply 1, and is electrically connected to the external power source 4 and the power integration panel 3, and has a second boot up state to receive a second power ON/OFF signal D2 and transforms the external power to a secondary duty power, and a second standby state to stop transformation of the external power. In addition, the power integration panel 3 is electrically connected to the each primary power supply 1 and each secondary power supply 2, and also is electrically connected to a motherboard 5 to provide power to the motherboard 5.

Figure 3:
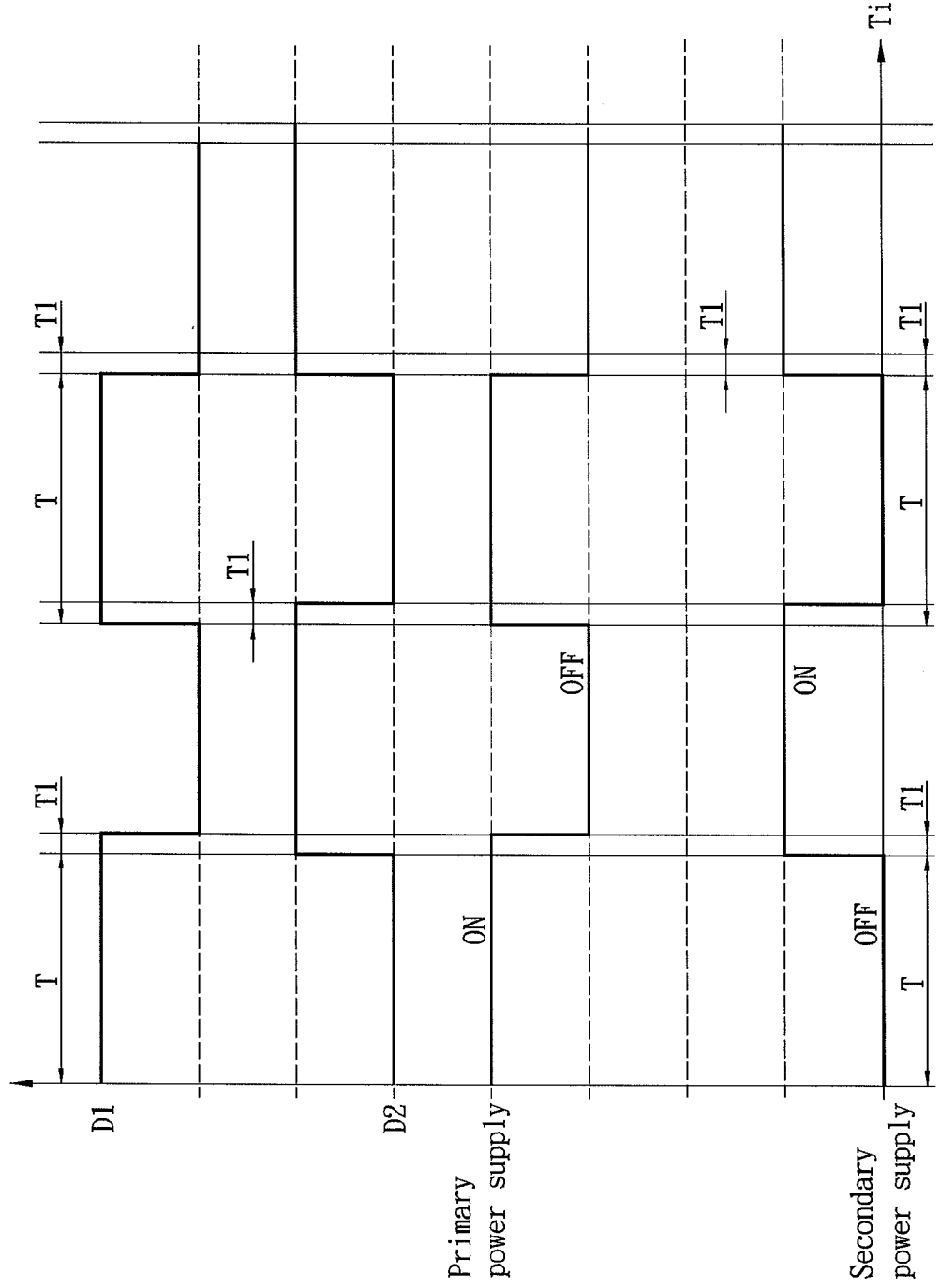
FIG. 3 is a schematic waveform chart of another embodiment of the invention in an implementation condition.

More specifically, the motherboard 5 is started via manual operation, first, it sends a power ON/OFF signal (Ps_on) to the power integration panel 3 which, after having received the power ON/OFF signal (Ps_on), activates each primary power supply 1 or each secondary power supply 2; moreover, the power integration panel 3 integrates the primary duty power and the secondary duty power generated respectively by the primary power supply 1 and the secondary power supply 2, and sends the power to the motherboard 5 for operation thereof. In addition, the power integration panel 3 further can include an energy-saving control loop 31 to receive the power ON/OFF signal (Ps_on) and perform simulation to generate the first power ON/OFF signal D1 or the second power ON/OFF signal D2, a first line 32 to bridge the energy-saving control loop 31 and the primary power supply 1 and send the first power ON/OFF signal D1 to the primary power supply 1, and a second line 33 to bridge the energy-saving control loop 31 and the secondary power supply 2 and send the second power ON/OFF signal D2 to the secondary power supply 2. In addition, the power integration panel 3 further has a standby mode to receive the power ON/OFF signal (Ps_on) from the motherboard 5 and output alternately at a selected time interval T the first power ON/OFF signal D1 to the primary power supply 1 or the second power ON/OFF signal D2 to the secondary power supply 2 to make the primary power supply 1 and the secondary power supply 2 on standby alternately. More specifically, after the power integration panel 3 has received the power ON/OFF signal (Ps_on) from the motherboard 5, it performs simulation to generate the first power ON/OFF signal D1 or the second power ON/OFF signal D2; then the power integration panel 3 outputs the first power ON/OFF signal D1 via the first line 32 to the primary power supply 1 to make the primary power supply 1 to enter the first boot up state and transform the external power to the primary duty power sent to the power integration panel 3; the power integration panel 3, after the selected time interval T has elapsed, stops sending the first power ON/OFF signal D1 to the primary power supply 1, instead, sends the second power ON/OFF signal D2 to the secondary power supply 2; meanwhile, the primary power supply 1 does not receive the first power ON/OFF signal D1 and enters the first standby state, while the secondary power supply 2 has received the second power ON/OFF signal D2 and enters the second boot up state, hence the secondary power supply 2 outputs the secondary duty power. Such a cycle continues, after another selected time interval T has elapsed, the power integration panel 3 stops sending the second power ON/OFF signal D2 to the secondary power supply 2 so that the secondary power supply 2 enters the second standby state; meanwhile, the power integration panel 3 outputs again the first power ON/OFF signal D1 to the primary power supply 1 to make it at the first boot up state anew; thus enter another cycle. I.e., upon elapsing of the selected time interval T, the primary power supply 1 and the secondary power supply 2 are started alternately to enter the standby state in turn. The primary power supply 1 or the secondary power supply 2 on standby is in fact enters the standby state so that the power integration panel 3 can start whenever needed the standby primary power supply 1 or the secondary power supply 2 according to duty requirement of the motherboard 5. Also referring to FIG. 3, in another embodiment the power integration panel 3, after the selected time interval T has elapsed, can make the primary power supply 1 without receiving the first power ON/OFF signal D1 or the secondary power supply 2 without receiving the second power ON/OFF signal D2 to defer for a duty time T1 before entering the first standby state or the second standby state. For instance, the primary power supply 1 is at the first boot up state to supply power, and the power integration panel 3 judges that the selected time interval T has elapsed, it immediately sends the second power ON/OFF signal D2 to the secondary power supply 2 to change from the second standby state to the second boot up state, and the primary power supply 1 is controlled by the power integration panel 3 to continuously supply the power until the duty time T1 has elapsed, then is changed from the first boot up state to the first standby state. Thus, the concern of power supply interruption can be avoided during switching of power supply between the primary power supply 1 and the secondary power supply 2.

Furthermore, in another embodiment of the invention each primary power supply 1 generates a first light load duty parameter or a first heavy load duty parameter at the first boot up state according to the primary duty power output by comparing with an output comparison datum. Each secondary power supply 2 generates a second light load duty parameter or a second heavy load duty parameter at the second boot up state according to the secondary duty power output by comparing with the output comparison datum. More specifically, each primary power supply 1 has a first output status analysis unit 17 with the output comparison datum preset therein to compare with the primary duty power to generate the first light load duty parameter or the first heavy load duty parameter, and each secondary power supply 2 has a second output status analysis unit 27 with the output comparison datum preset therein to compare with the secondary duty power to generate the second light load duty parameter or the second heavy load duty parameter. The output comparison datum can be a current value, or an output power value or the like. Take the output power value as an example, in one embodiment the output comparison datum is preset at 100 watts. In the event that the primary power supply 1 outputs the primary duty power at 125 watts, the first output status analysis unit 17 judges that a heavy load occurs, and outputs the first heavy load duty parameter. On the other hand, in the event that the secondary power supply 2 outputs the secondary duty power at 80 watts, the second output status analysis unit 27 judges that a light load occurs, and outputs the second light load duty parameter. The power integration panel 3 receives the first light load duty parameter or the second light load duty parameter, and determines to enter the standby mode; namely, when the motherboard of the redundant power supply system of the invention is at a low energy consumption state, the primary power supply 1 or the secondary power supply 2 that supplies power at the light load is ordered to enter the standby mode, and the primary power supply 1 and the secondary power supply 2 also are ordered to standby alternately.

Moreover, in another embodiment, the power integration panel 3 further has a power supply start mode to receive the first heavy load duty parameter and the second heavy load duty parameter and at the same time output respectively the first power ON/OFF signal D1 and the second power ON/OFF signal D2 to the primary power supply 1 and the secondary power supply 2. More specifically, during the power integration panel 3 starts alternately the primary power supply 1 or the secondary power supply 2, it receives the first heavy load duty parameter generated by the first output status analysis unit 17 and the second heavy load duty parameter generated by the second output status analysis unit 27, and enters the power supply start mode, and at the same time outputs respectively the first power ON/OFF signal D1 and the second power ON/OFF signal D2 to the primary power supply 1 and the secondary power supply 2 to start the primary power supply 1 and the secondary power supply 2 simultaneously. In addition, the power integration panel 3 further includes an energy-saving control loop 31 to receive the first light load duty parameter, the first heavy load duty parameter, the second light load duty parameter or the second heavy load duty parameter to determine whether the power integration panel 3 to enter the standby mode or the power supply start mode.

In short, the redundant power supply system providing alternate standby of the invention includes at least one primary power supply, at least one secondary power supply and a power integration panel. Each primary power supply receives a first power ON/OFF signal and starts immediately to output a primary duty power. Each secondary power supply receives a second power ON/OFF signal and starts immediately to output a secondary duty power. The power integration panel is electrically connected to the primary power supply and the secondary power supply, and has a standby mode to receive a power ON/OFF signal from a motherboard and output alternately at a selected time interval the first power ON/OFF signal to the primary power supply or the second power ON/OFF signal to the secondary power supply to make the primary power supply and the secondary power supply at a standby mode alternately. Thus, the phenomenon of one power supply of the redundant power supply system supplying power for a prolonged duration that might result in a lifespan shorter than other power supply in the redundant power supply system can be prevented from taking place.

What is claimed is:

1. A redundant power supply system providing alternate standby, comprising:
    at least one primary power supply which includes a first boot up state to receive a first power ON/OFF signal to transform an external power and output a primary duty power and a first standby state to stop transformation of the external power;
    at least one secondary power supply which includes a second boot up state to receive a second power ON/OFF signal to transform the external power and output a secondary duty power and a second standby state to stop transformation of the external power; and
    a power integration panel which is electrically connected to the primary power supply and the secondary power supply, and includes an energy-saving control loop to receive a power ON/OFF signal from a motherboard and perform simulation to generate the first power ON/OFF signal or the second power ON/OFF signal, and also includes a standby mode to receive the power ON/OFF signal from the motherboard and output at a selected time interval the first power ON/OFF signal to the primary power supply or the second power ON/OFF signal to the secondary power supply to make the primary power supply and the secondary power supply on standby alternately.

2. The redundant power supply system of claim 1, wherein the power integration panel further includes a first line to bridge the energy-saving control loop and the primary power supply to output the first power ON/OFF signal to the primary power supply, and a second line to bridge the energy-saving control loop and the secondary power supply to output the second power ON/OFF signal to the secondary power supply.

3. The redundant power supply system of claim 1, wherein the primary power supply generates a first light load duty parameter or a first heavy load duty parameter at the first boot up state by comparing the output primary duty power with an output comparison datum, and the secondary power supply generates a second light load duty parameter or a second heavy load duty parameter at the second boot up state by comparing the output secondary duty power with the output comparison datum, and the power integration panel receives the first light load duty parameter or the second light load duty parameter to determine to enter the standby mode.

4. The redundant power supply system of claim 3, wherein the power integration panel further includes a power supply start mode to receive the first heavy load duty parameter and the second heavy load duty parameter to output at the same time the first power ON/OFF signal to the primary power supply and the second power ON/OFF signal to the secondary power supply.

5. The redundant power supply system of claim 3, wherein the power integration panel further includes an energy-saving control loop to receive the first light load duty parameter, the first heavy load duty parameter, the second light load duty parameter or the second heavy load duty parameter to determine to enter the standby mode.

6. The redundant power supply system of claim 4, wherein the power integration panel further includes an energy-saving control loop to receive the first light load duty parameter, the first heavy load duty parameter, the second light load duty parameter or the second heavy load duty parameter to determine to enter the standby mode.

7. The redundant power supply system of claim 5, wherein the primary power supply includes a first output status analysis unit which includes the output comparison datum preset therein to compare with the primary duty power to generate the first light load duty parameter or the first heavy load duty parameter, and the secondary power supply includes a second output status analysis unit which includes the output comparison datum preset therein to compare with the secondary duty power to generate the second light load duty parameter or the second heavy load duty parameter.

8. The redundant power supply system of claim 6, wherein the primary power supply includes a first output status analysis unit which includes the output comparison datum preset therein to compare with the primary duty power to generate the first light load duty parameter or the first heavy load duty parameter, and the secondary power supply includes a second output status analysis unit which includes the output comparison datum preset therein to compare with the secondary duty power to generate the second light load duty parameter or the second heavy load duty parameter.

9. The redundant power supply system of claim 1, wherein the power integration panel orders after the selected time interval has elapsed the primary power supply without receiving the first power ON/OFF signal or the secondary power supply without receiving the second power ON/OFF signal to defer for a duty time before entering the first standby state or the second standby state.

10. The redundant power supply system of claim 1, wherein the primary power supply includes a rectification filter unit to receive the external power, a power factor correction unit connected to the rectification filter unit, a transformer, a pulse width control unit, a switch element and a modulation output unit.

11. The redundant power supply system of claim 1, wherein the secondary power supply includes a rectification filter unit to receive the external power, a power factor correction unit connected to the rectification filter unit, a transformer, a pulse width control unit, a switch element and a modulation output unit.

* * * * *